Aug. 30, 1960 E. B. NOLT ET AL 2,950,670
HAY BALERS
Filed March 29, 1956 4 Sheets-Sheet 4
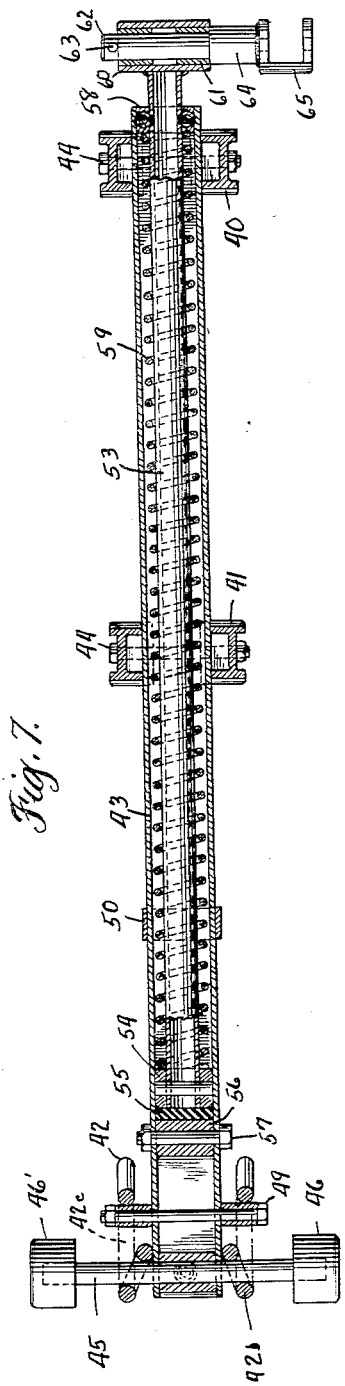
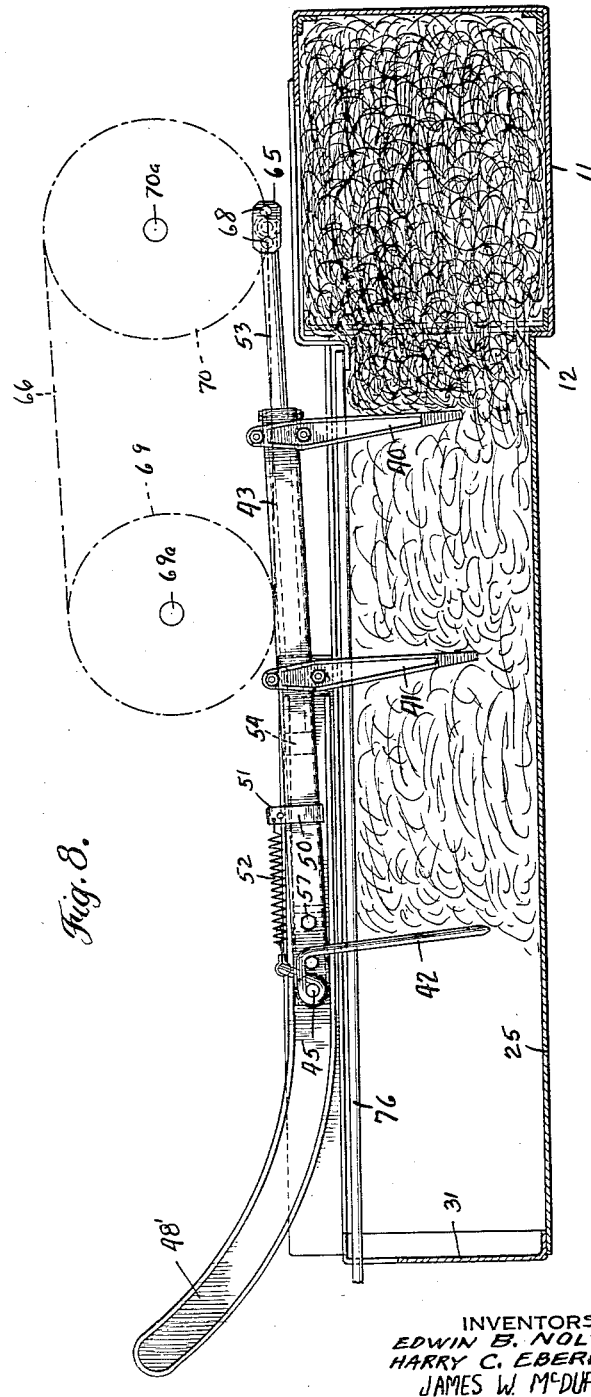
INVENTORS
EDWIN B. NOLT
HARRY C. EBERLY
JAMES W. McDUFFIE
BY Joseph Allan Brown
ATTORNEY United States Patent Office 2,950,670
Patented Aug. 30, 1960

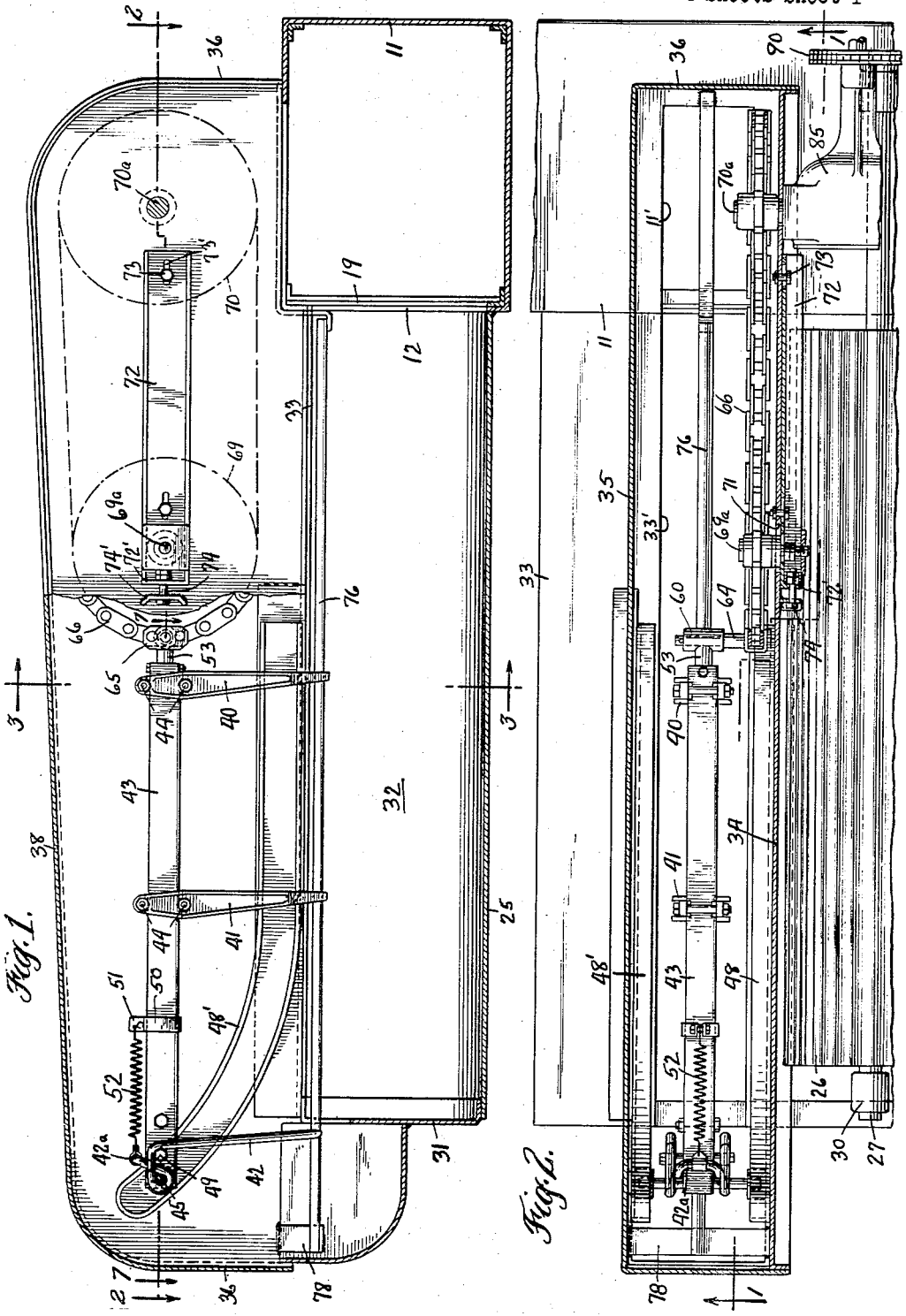

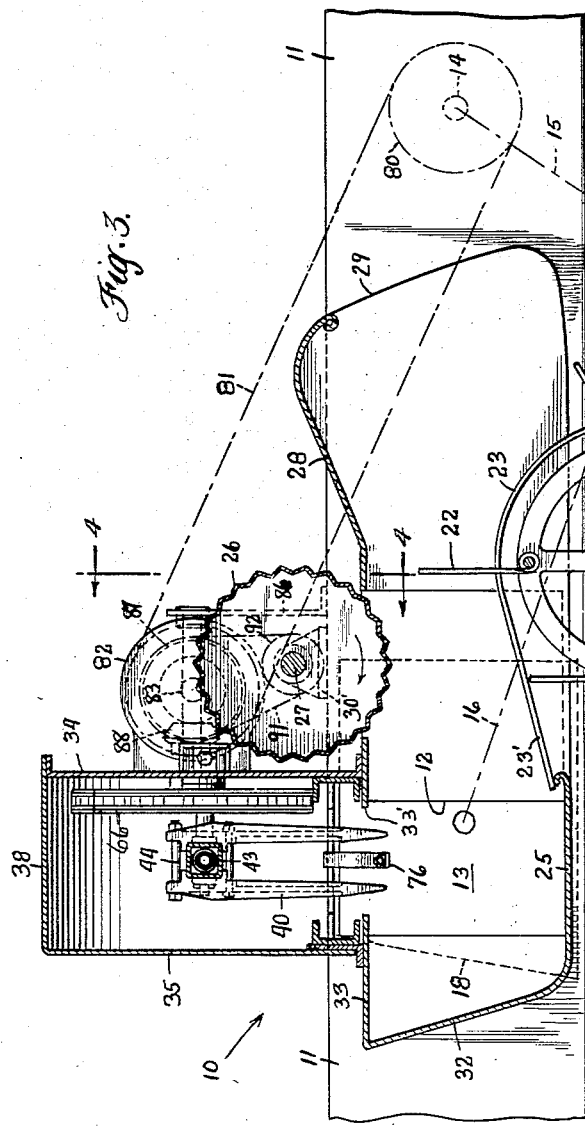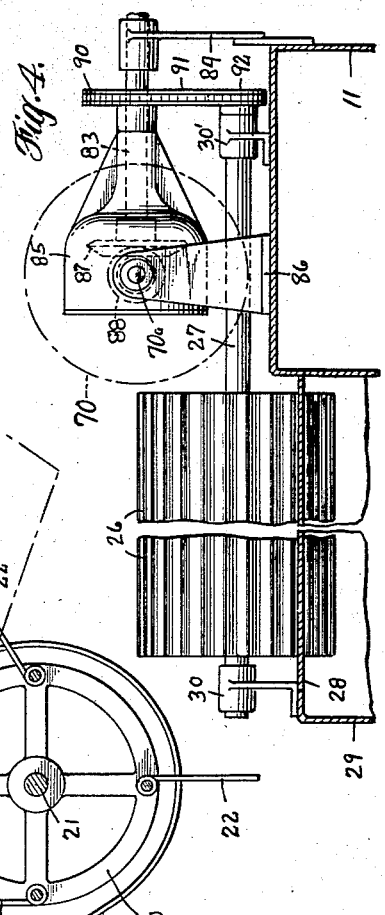

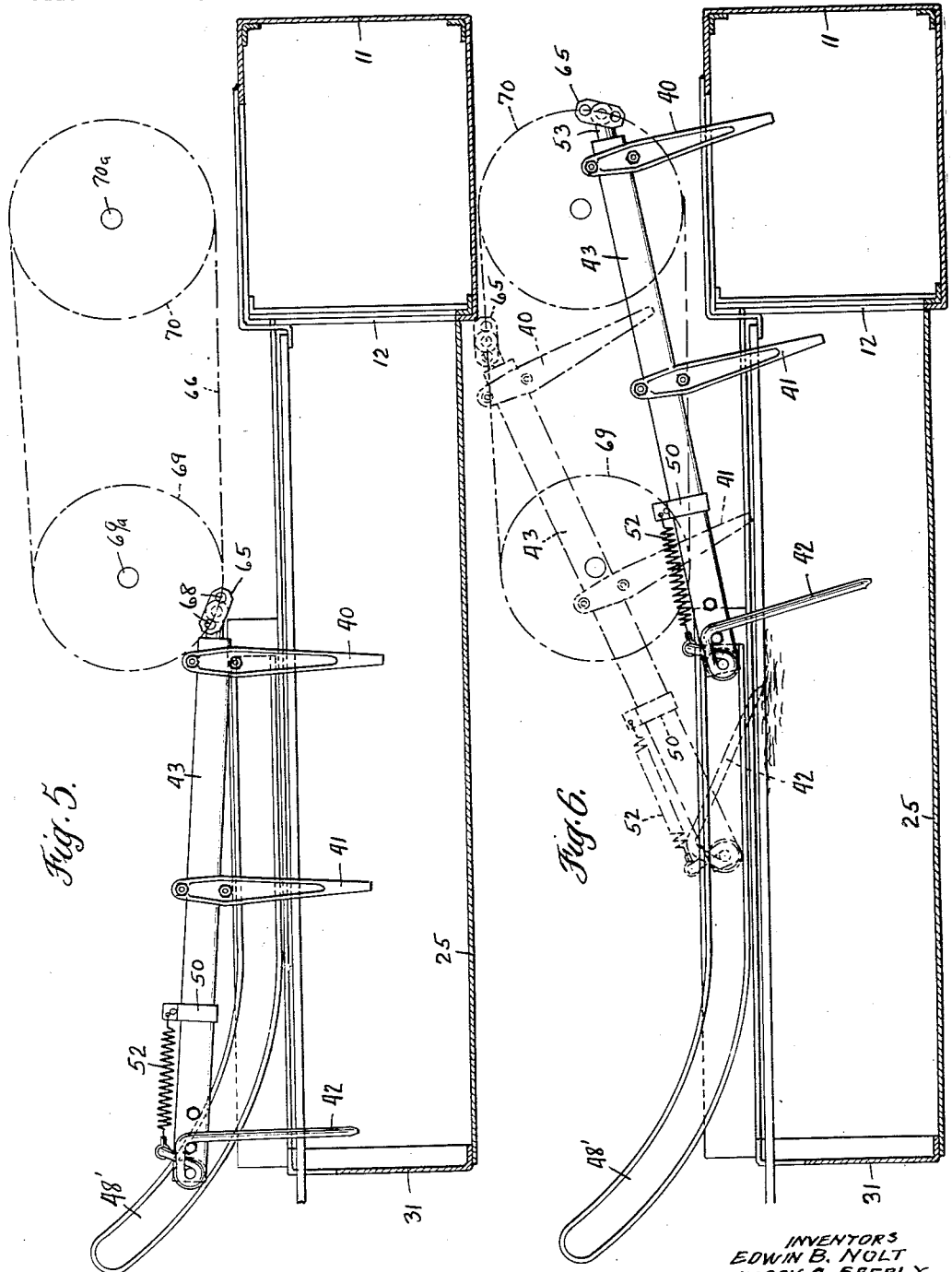

2,950,670

HAY BALERS

Edwin B. Nolt, New Holland, Harry C. Eberly, Narvon, and James W. McDuffie, New Holland, Pa., assignors to Sperry Rand Corporation, New Holland, Pa., a corporation of Delaware Filed Mar. 29, 1956, Ser. No. 574,698

17 Claims. (Cl. 100—142)

The present invention relates generally to hay balers and more particularly to an automatic hay baler of the type in which hay is delivered into a bale chamber through an opening in a side thereof by means entering the bale chamber in timed relation to a plunger reciprocable in the chamber and past the opening therein. Still more specifically the invention relates to an improved infeed mechanism of the finger or tine type for such a baler.

One object of this invention is to provide a finger feed mechanism, in a baler of the character described, which will operate more effectively than finger feed mechanisms available heretofore.

Another object of this invention is to provide a finger feed mechanism which meters hay into a bale chamber, automatically varying the feed rate according to prevailing feeding conditions.

Another object of this invention is to provide a finger feed mechanism which will evenly distribute hay in a bale chamber and properly fill the upper, outer corner of the bale chamber remote from the feed opening in the chamber.

Another object of this invention is to provide a finger feed mechanism in which the fingers are supported in a novel manner to protect them from damage should an immoveable obstacle be encountered during a feeding stroke.

Another object of this invention is to provide a finger feed mechanism which is driven by an endless chain trained around spaced sprockets, said mechanism being provided with means for insuring against damage of the endless chain or its sprockets when the feed mechanism is in operation.

A further object of this invention is to provide means in a finger feed mechanism which causes the fingers to feed in a direction inclined downwardly during the initial portion of a working stroke and inclined upwardly in the latter portion of the working stroke.

A still further object of this invention is to provide a finger feed mechanism of rugged construction and few parts thereby enabling the manufacture of the mechanism at low cost.

Other objects of this invention will be apparent hereinafter from the specification and from the recital in the appended claims.

In the drawings:

Fig. 1 is a vertical section through an automatic hay baler having an infeed mechanism constructed according to one embodiment of this invention, the section being taken generally on the lines 1—1 of Fig. 2 and looking in the direction of the arrows;

Fig. 2 is a section taken on the line 2—2 of Fig. 1 and looking in the direction of the arrows;

Fig. 3 is a part side elevation, part section taken on the line 3—3 of Fig. 1 and looking in the direction of the arrows;

Fig. 4 is a fragmentary section taken on the line 4—4 of Fig. 3 and looking in the direction of the arrows;

Figs. 5–6 are views similar to Fig. 1 showing the infeed mechanism at different stages of its operating cycle;

Fig. 7 is a section through the mounting bar for the feed fingers and illustrating the spring means within the bar; and Fig. 8 is a part section, part side elevation illustrating the operation of the feed mechanism control means.

Referring now to the drawings by numerals of reference, 10 (Fig. 3) denotes generally the pick-up and feed mechanism section of an automatic hay baler. The baler is supported on a wheel structure, not shown; and, it is adapted to be drawn by a tractor across a field of cut and windrowed hay, toward the right of Fig. 3.

The baler has a bale chamber 11, rectangular in cross section and provided with a feed opening 12 (Fig. 1) in one vertical side wall thereof. A plunger 13 is reciprocable longitudinally within bale chamber 11, and past opening 12. The plunger is driven from a rotating shaft 14 by means of a crank arm 15 and pitman 16 illustrated diagrammatically in Fig. 3.

Plunger 13 operates in a conventional manner to compress the hay fed into chamber 11 and to force the successive bales rearwardly through the chamber. A knife blade 18 is angularly carried on the working end of plunger 13. Blade 18 cooperates with a ledger knife 19 (Fig. 1) affixed to the chamber 11 adjacent the rear edge of opening 12 to cut the hay fed into the chamber into separate wads.

The baler has a pick-up mechanism which includes a reel 20 mounted on a suitably journaled shaft 21 driven from a source of power not shown. Reel 20 has a plurality of tines 22 moveable between spaced, parallel, stripper plates 23 to pick up hay from the ground and deliver it rearwardly over tangential extensions 23' of the stripper plates and onto a horizontal feed platform 25. Tines 22 are assisted in their feeding task by a drum 26 mounted on a shaft 27 and rotatably driven in a direction indicated by the arrow (Fig. 3). Drum 26 may be corrugated, as shown, or of any other desired surface configuration. The drum projects downwardly through an opening in the top wall or roof 28 of the housing 29 for the pick-up mechanism. Shaft 27 is journaled in bearing supports 30 and 30' mounted on top wall 28 and bale chamber 11, respectively, (Fig. 4). It is driven by means hereinafter described.

The feed platform 25 extends horizontally from the lower edge of feed opening 12 in bale case 11 and transverse to the direction of reciprocating plunger 13. The hay fed onto platform 25 is confined against improper lateral escape by side wall 31 and rear wall 32; and it is prevented from piling up and overflowing these walls by a cover plate 33.

Mounted above platform 25 and bale case 11 and extending in the same direction as the platform is a housing (Figs. 1–3) which comprises a front wall 34, a rear wall 35, side walls 36 and a top wall 38. This housing contains a mechanism adapted to feed hay across platform 25, through opening 12, into bale chamber 11 and in front of plunger 13 reciprocable therein.

The feed mechanism comprises a plurality of pairs of fingers, namely, forward or first fingers 40, middle or second fingers 41 and rear fingers 42. These fingers are mounted on a tubular bar or support member 43 which is rectangular in cross section. The forward and middle pairs of fingers are rigidly affixed to bar 43 by bolts 44, which extend over and under the bar. Fingers 40 and 41 extend in fixed angular relation to bar 43. By releasing the nuts on bolts 44, fingers 40 and 41 can be adjusted along the bar to desired position. Generally, fingers 40 are disposed close to the adjacent end of bar 43, as shown in the drawings. The fingers 41 are positioned between the fingers 40 and 42 and usually somewhat closed to the fingers 40 than the fingers 42. Also, the fingers 41 are so positioned on bar 43 that they remain outside of the bale chamber during a feeding stroke of the feeder (Fig. 6). Rear fingers 42 are pivotally mounted on a shaft 45 which projects through bar 43. (Figs. 1 and 7.)

Shaft 45 has a roller 46 at one end and a roller 46' at its other end which fit into and travel over spaced, parallel cam tracks 48 and 48', respectively. Cam tracks 48 and 48' are welded or otherwise affixed to front wall 34 and rear wall 35, respectively, of the infeed mechanism housing.

Rear fingers 42 are made from a single piece of rod having a horizontal portion 42a which extends across the top of bar 43, loops 42b on opposite sides of the bar which extend around shaft 45, horizontal portions 42c which extend along the sides of the bar and then project downwardly around the outwardly projecting ends of a pin 49 extending through bar 43 and connected thereto as shown in Fig. 7. A strap or bracket 50 surrounds bar 43 at a point approximately intermediate fingers 41 and 42. This strap has upwardly projecting ears 51 to which one end of a tension spring 52 is attached. The opposite end of spring 52 is connected to the horizontal portion 42a of fingers 42. Spring 52 biases fingers 42 in a clockwise direction (Fig. 1) and against pin 49. As will be described hereinafter, fingers 42 are free to pivot about shaft 45 in a counter-clockwise direction against the force of spring 52 on a return stroke of the feed mechanism.

Extending into tubular bar 43 is a rod 53 (Fig. 7) having a piston-like member 54 connected to its inner end which is slideable in the bar 43. Member 54 seats against a bumper 55, of rubber or some other resilient material, which abuts against a stop 56 fixedly connected to bar 43 by nut-bolt means 57. The outer end of rod 53 extends through a bearing block 58 within bar 43 and bolted thereto. Interposed between fixed bearing block 58 and slideable member 54 and surrounding rod 53 is a metering spring 59 which resists movement of rod 53 outwardly of bar 43.

Welded to the outer end of rod 53 is a sleeve 60 having bushings 61 in which a shaft 62 is rotatable. Shaft 62 is held against axial movement in sleeve 60 by a cotter pin 63 projecting through one end of the shaft and an enlarged head 64 at the opposite end of the shaft. Welded to head 64 is a U-shaped bracket 65 which straddles an endless chain 66 and is connected to a link thereon by bolts 68. Chain 66 is trained around sprocket wheels 69 and 70, the hubs of which are mounted on shafts 69a and 70a.

Shaft 69a extends through an elongated slot 71 (Fig. 2) in the forward wall 34 of the feed mechanism housing. It is supported on one end of a bracket bar 72 (Fig. 1) connected to wall 34 by bolts 73 which extend through elongated slots 73' in the bar. The bar may be adjusted laterally upon loosening nuts 73 to thereby adjust shaft 69a toward or away from shaft 70a to effect proper tightness on endless chain 66. Cooperative with bolts 73 to hold bar 72 in adjusted position is bolt 74 (Figs. 1 and 2) carried on a projection 74' welded to wall 34. Bolt 74 is connectable to a flange 72' on the end of bar 72.

As shown in Figs. 2 and 3, the top plate or wall 33 of the chamber into which the picked up hay is fed has a transverse slot 33' through which fingers 40, 41 and 42 are adapted to be projected to sweep the hay across platform 25 and into bale chamber 11. The top wall of the bale chamber has a slot 11' which registers with slot 33' so that forward fingers 40 may enter chamber 11 through opening 12 and then be extracted therefrom through slot 11'. To prevent hay from moving upwardly into the feed mechanism housing through slots 33' and 11', and to strip any hay which may be clinging to the feed fingers after a working stroke, a stripper rod 76 is provided. Rod 76 is supported at one end on bale chamber 11 and at its opposite end on a bracket 78 (Figs. 1 and 2) affixed to front wall 34 and rear wall 35 of the feed mechanism housing. The rod extends between each pair of fingers, as shown in Fig. 3.

It is essential to the present invention that endless chain 66 be driven continuously in timed relation to the reciprocations of bale plunger 13. To this end, endless chain 66 is driven from a sprocket 80 (Fig. 3), on plunger crank shaft 14, by means of an endless chain 81 passed around a sprocket 82 fixed on a shaft 83 (Fig. 4). Shaft 83 is supported at one end, and inwardly of sprocket 82, in a bracket 84 affixed to bale chamber 11 and at its opposite end by a gear box 85 mounted on pedestals 86 seated on bale chamber 11. A bevel gear 87 keyed on shaft 83 within gear box 85 meshes with a bevel gear 88 keyed on the shaft 70a of sprocket wheel 70.

The driving of the feed mechanism from shaft 14 is so timed with the driving of the plunger that fingers 40 enter chamber 11 while plunger 13 is retracted, and are withdrawn through the top slot 11' in the bale chamber in sufficient time to avoid damage by the plunger on its next compression stroke.

Between bracket support 84 and gear box 85 is a sprocket 90 keyed on shaft 83 and driven thereby. An endless chain 91 is passed around sprocket 90 and around a sprocket 92 connected to one end of shaft 27 on which the feed drum 26 is mounted to thereby rotate the drum.

In the operation of the invention, as the baler moves along a windrow, tines 22 on a reel 20 pick up the hay and convey it over stripper plates 23 and extensions 23' and onto feed platform 25. Feed drum 26, driven from shaft 14 through endless chain 81, shaft 83, sprocket 90, chain 91, sprocket 92, and shaft 27, assists in the feeding of hay onto platform 25 and prevents the accumulation of hay against top wall 28 of the pick-up housing.

The sets of feed fingers 40, 41, and 42 sweep the hay across platform 25, through opening 12 in bale chamber 11 and into the path of plunger 13. Plunger 13 is reciprocating constantly from shaft 14 through crank arm 15 and pitman 16. The plunger blade 18, cooperating with ledger blade 19, cuts off the hay fed into bale chamber 11 each time the plunger comes forward on a working stroke. The plunger compresses the separate wads, forcing the bale rearwardly as it is formed. Means, such as a star wheel rotatable responsive to growth of the bale, initiates the operation of a tying mechanism, not shown, upon completion of each bale to automatically band and tie each bale. The tying operation takes place between strokes of plunger 13.

Feed fingers 40—42 are reciprocated continuously in time with plunger 13 from shaft 14 through endless chain 81, sprocket 82, shaft 83, bevel gears 87 and 88 and shaft 70a for sprocket 70, so that forward fingers 40 enter and leave bale chamber 11 between strokes of the plunger.

At the beginning of a working or feed stroke, the finger mechanism assumes the position as shown in Fig. 1 with support bar 43 horizontal to platform 25. As the working stroke commences, bar 43 is inclined slightly downwardly toward the feed platform and fingers 40—42 travel downwardly and forwardly as they engage the hay (Fig. 5). When the fingers have been fully projected through the top plate 33 they travel substantially parallel to platform 25, until the latter portion of the working stroke whereupon bar 43 is sharply inclined upwardly (Fig. 6). Forward fingers 40 enter bale chamber 11 through opening 12 and sweep in an arc toward the upper, outer corner of the bale chamber thereby insuring proper filling of this corner of the bale chamber. Fingers 40 are extracted through slot 11' in the top wall of the bale chamber. As shown in Fig. 6, middle fingers 41 do not enter bale chamber 11, being extracted through slot 33' in top wall 33 when the feeding stroke has been completed.

The configuration of cam tracks 48—48' in association with the position of finger feed drive chain 66 produces the aforementioned inclinations of bar 43 on a feeding stroke, the upward, arcuate sweep of fingers 40 at the end of the stroke being very important to the production of solid, well filled out bales.

At the end of the feeding stroke fingers 40 and 41 are positioned above the top of bale chamber 11 and top plate 33, respectively, any hay tending to cling to the feed fingers having been stripped off by stripper rod 76. Rear fingers 42 remain below top plate 33 during the main portion of the return stroke or until rollers 46 and 46' ride up on the arcuate portions of the cam tracks 48—48'. It is for this reason that rear fingers 42 are mounted for counterclockwise pivotal movement. On a retracting stroke fingers 42 engage the hay on platform 42, as shown in dotted lines in Fig. 6, and are swung upwardly against the resistance of spring 52. Spring 52 is a light spring exerting only sufficient force to swing fingers 42 clockwise after they have been lifted above top plate 33 as shown in Fig. 1. Stripper bar 76 removes any hay tending to cling to fingers 42 as they are extracted.

Applicants' baler is designed to bale hay under all conditions normally encountered. As the baler travels over the field, the hay picked up from elevated areas may be fully dried out while hay picked up from low areas in the field may be wet. The hay is subject to greater compression when dry and, conversely, less compression when wet. Therefore, metering means to regulate quantitatively the feeding of hay into bale chamber 11 has been provided.

This metering means is provided by spring 59 in finger support bar 43. If, for example, the hay or platform is wet a situation such as shown in Fig. 8 may occur with bale chamber 11 becoming filled with hay after only a portion of the feeding stroke of the feeding mechanism has taken place. When this occurs, and forward fingers 40 engage an immoveable mass of hay, the feeding movement ceases. However, the drive means for the feeding mechanism continues to function with rod 53 being extended outwardly and compressing spring 59 between member 54 and bearing block 58. The feed fingers are only capable of delivering a feeding force proportionate to the force of spring 59. Once an obstacle is encountered which exerts a resisting force greater than the force of spring 59, the feeding ceases and spring 59 is compressed as rod 53 is pulled outwardly by drive chain 66.

The metering means also provides for variations in the windrow. When a light or average amount of hay is delivered to platform 25, the feeding mechanism functions as shown in Figs. 1, 5 and 6. If an extra heavy charge of hay is delivered to platform 25, the metering means comes into operation to regulate the feeding until the overloaded platform condition has been obviated.

Another important feature of applicants' invention is that a long feeding stroke is provided whereby the rear fingers 42 move more than half way across platform 25 (Fig. 6) on a feeding stroke. On the next feeding stroke forward fingers 40 engage the hay on platform 25 at a point behind where rear fingers 42 stopped on the preceding stroke. At the same time, this long stroke operation is provided from a feed drive having relatively small diameter sprockets and a short drive chain. Thus, material costs are reduced resulting in lower manufacturing costs; and, further, the baler can be made more compact and of sharper appearance.

Moreover, the long, sweeping reciprocating strokes of fingers 40—42 across platform 25 and through bale chamber 11 produce a feed motion never before attained, and far superior to any heretofore available.

While this invention has been described in connection with a particular embodiment thereof, it will be understood that it is capable of further modification and this application is intended to cover any variations, uses or adaptations of the invention, following, in general, the principles of the invention and including such departures from the present disclosure as come within known or customary practice in the art to which the invention pertains, and as fall within the scope of the invention as the limits of the appended claims.

Having thus described our invention, what we claim is:

1. A hay baler comprising a bale chamber having a feed opening in a vertical side wall thereof, a plunger reciprocable in said chamber and past said opening, a hay platform extending from said feed opening, and means for feeding hay into said chamber, said feeding means comprising a support bar extending above said platform in the direction of extent of the platform, a forward feed finger fixedly mounted on said support bar, a rear feed finger on said support bar, means for reciprocating said support bar in timed relation to said plunger whereby in one direction of movement of the bar said feed fingers sweep hay across said platform, through said opening and into said chamber, said forward finger at least entering said chamber, and means operative on movement of said bar in said one direction to incline the bar downwardly toward the platform, then substantially parallel to the platform, then upwardly relative thereto, the upward movement of said bar being so related to said bale chamber that said forward finger moves upwardly in the chamber, said means being operative on movement of the bar in the other direction to first hold the bar inclined relative to the platform and then to shift it to a position substantially parallel thereto, both of said feed fingers extending perpendicular to said bar when it is moving in said one direction, and means for mounting said rear finger for pivotal movement relative to said bar on movement of the bar in said other direction only.

2. In a hay baler having a bale chamber formed with a feed opening in a vertical side wall thereof and a slot in a wall perpendicular to said side wall, said slot communicating with said opening, and a hay receiving platform extending laterally from said opening, the combination of means for feeding hay into said bale chamber and for simultaneously automatically regulating quantitatively the feeding of such hay, said feeding and regulating means comprising a tubular support bar extending above said hay platform in the direction of extent of the platform, said tubular support bar having a forward end approximate to said bale chamber and a rear end remote from said bale chamber, a plurality of feed fingers mounted on said tubular support bar in fixed, spaced relation thereon and depending therefrom, a rod projecting into said tubular support bar through its forward end, a member connected to the inner end of said rod, a bearing member fixedly connected to said tubular support bar at its forward end through which said rod extends, a spring interposed between said member on said rod and said bearing member whereby movement of said rod outwardly of said tubular support bar is resisted, drive means connected to the outer end of said rod to reciprocate said rod, said tubular support bar and the feed fingers thereon normally moving with said reciprocating rod whereby in one direction of movement of the rod said feed fingers sweep hay across said platform, through said opening and into said bale chamber, the forward finger of said plurality of feed fingers entering said bale chamber through said opening and being extracted therefrom through said slot, said interposed spring permitting relative movement between said rod and said tubular support bar when a resistance force is encountered by said feed fingers on a feeding stroke greater than the force of said spring.

3. The combination with claim 2 in which control means is provided to incline said tubular support bar downwardly toward said hay platform, then substantially parallel to the platform, then upwardly relative thereto on a feeding stroke of said feed fingers.

4. The combination with claim 3 in which said control means comprises a cam track fixedly mounted relative to said hay platform and a cam follower carried on the rear end of said support bar.

5. A hay baler comprising a bale chamber having a feed opening in a vertical side wall thereof, a plunger reciprocable in said chamber and past said opening, a hay platform extending from said feed opening and transversely to the direction of reciprocation of said plunger, means operable over substantially the full length of said platform for feeding hay into said chamber, said feeding means comprising a support bar extending above said platform and in the direction of extent of the platform, a plurality of feed fingers in fixed spaced relationship on said support bar and depending therefrom, means for reciprocating said bar over said platform and said bale chamber in timed relation to said plunger, said feed fingers sweeping hay across said platform, through said opening, and into said bale chamber in one direction of travel of said support bar, a cam track spacedly mounted relative to said bale chamber, a pair of spaced cam followers, one mounted on each side of said support bar at the end thereof remote from said bale chamber, said cam followers being movable over said track and restraining said support bar from pivotal movement about its longitudinal axis, said reciprocating means comprising driven sprocket means mounted adjacent said bale chamber, a single endless chain rotatable around said sprocket means, a shaft mounted on said chain for rotation therewith and projecting laterally of the chain and the sprocket means, and means for connecting said shaft to the end of said support bar opposite said remote end.

6. In a hay baler, a feed mechanism comprising an elongate tubular support bar, a plurality of feed fingers mounted on said bar in spaced relation thereon and extending generally perpendicular to the longitudinal axis of the bar, a rod projecting into said bar through one end thereof, a piston connected to the inner end of said rod, a bearing fixedly connected to said bar adjacent said one end and through which said rod extends, a spring on said rod and interposed between said piston and bearing for resisting movement of said piston toward said one end of said bar, drive means for reciprocating said bar comprising sprocket means, a chain rotatable around said sprocket means, a shaft connected to said chain and projecting laterally of the chain and sprocket means, and means for connecting said shaft to the outer end of said rod, and means for preventing pivotal movement of said bar about its longitudinal axis and for guiding said bar in its reciprocating movements.

7. In a hay baler as recited in claim 6, wherein the means for preventing pivotal movement of said bar about its longitudinal axis and for guiding the bar in its reciprocating movements comprises a cam track, a pair of cam followers rollable on said cam track, and means for mounting said cam followers on the end of said support bars opposite said one end, said cam followers being disposed on opposite sides, respectively, of the support bar.

8. In a hay baler, a fore-and-aft horizontally extending bale chamber having a feed opening in a vertical side wall thereof and a slot in a top wall thereof, said slot communicating with said opening, a plunger reciprocable in said chamber and past said opening and slot, a hay receiving platform extending laterally from said opening, a support bar above said chamber and platform and extending in the direction of extent of the platform, said support bar having a forward end proximate to said chamber and a rear end remote therefrom, a plurality of feed fingers mounted on said support bar in spaced relation thereon and depending therefrom, said fingers being spaced in a direction away from said bale chamber and including a forward finger, a pair of laterally spaced sprockets rotatable in a vertical plane perpendicular to the fore-and-aft extension of said bale chamber, means supporting one of said sprockets over said bale chamber and the other sprocket over said platform, an endless chain extending around said sprockets, power means connected to at least one of said sprockets to drive said one sprocket and thus said chain, means connecting said forward end of said support bar to said chain, the position of said sprockets being such relative to said bale chamber that said forward end of the support bar and the forward finger thereon when moved by said chain toward said chamber moves downwardly, then generally parallel to said platform and into the chamber through said opening and slot, and then upwardly, said forward finger being extracted through said slot, and means supporting said rear end of said support bar.

9. In a hay baler, a fore-and-aft horizontally extending bale chamber having a feed opening in a vertical side wall thereof and a slot in a top wall thereof, said slot communicating with said opening, a plunger reciprocable in said chamber and past said opening and slot, a hay receiving platform extending laterally from said opening, a support bar above said chamber and platform and extending in the direction of extent of the platform, said support bar having a forward end proximate to said chamber and a rear end remote therefrom, a plurality of feed fingers mounted on said support bar in spaced relation thereon and depending therefrom, said fingers being spaced in a direction away from said bale chamber and including a forward finger, a pair of sprockets rotatable in a vertical plane perpendicular to the fore-and-aft extension of said bale chamber, means supporting one of said sprockets over said bale chamber and the other sprocket over said platform, the axes of rotation of both of said sprockets being at substantially the same horizontal plane, an endless chain extending around said sprockets, power means connected to at least one of said sprockets to drive said one sprocket and thus said chain, means connecting said forward end of said support bar to said chain, the position of said sprockets being such relative to said bale chamber that said forward end of the support bar and the forward finger thereon when moved by said chain toward said chamber moves downwardly, then generally parallel to said platform and into the chamber through said opening and slot and then upwardly, said forward finger being extracted through said slot, and means supporting said rear end of said support bar, said rear end supporting means comprising a cam track fixedly mounted relative to said platform and extending downwardly toward said platform and bale chamber and then parallel to the platform, cam followers cooperative with said cam track, and means pivotally connecting said cam followers to said rear end of said support bar.

10. A hay baler comprising a bale chamber having a bottom wall, a pair of vertical side walls and a top wall, one of said side walls having a feed opening and said top wall having a slot communicating with said opening, a plunger reciprocable in said bale chamber and past said opening and slot, a hay platform extending laterally from said feed opening and said bottom wall, means for conveying hay across said platform, through said opening and into said bale chamber, the hay conveyed into said bale chamber being directed against the vertical side wall opposite said one side wall, said conveying means comprising a support bar extending above said platform in the direction of extent thereof, a forward feed finger mounted on the end of said support bar adjacent said chamber, one other feed finger, at least, mounted on said support bar spaced behind said forward finger and more remote from said chamber, means connected to said support bar for reciprocating the bar rectilinearly in said direction whereby said fingers when moving toward said chamber sweep hay through said opening and against said opposite side wall, said forward finger normally entering said bale chamber through said opening and being extracted upwardly therefrom through said slot, said reciprocating means being synchronized with said plunger to prevent interference between said forward finger and said plunger, and a spring interposed between said reciprocating means and said support bar for regulating the feeding of hay into said bale chamber, said spring having a range of yielding movement greater than the distance said forward finger enters the bale chamber whereby on a feeding stroke the movement of said forward finger may be stopped by an accumulation of hay between such forward finger and said opposite bale chamber side wall with said forward finger outside said bale chamber.

11. In a hay baler, a generally horizontally extending bale chamber formed with a feed opening in a vertical side wall thereof and a slot in the top wall thereof, said slot communicating with said opening, a plunger reciprocable in said chamber and past said opening and slot, a hay receiving platform extending laterally from said opening, a support member extending above said bale chamber and platform in the direction of extent of the platform, said support member having a forward end proximate to said bale chamber and a rear end remote therefrom, a plurality of feed fingers mounted on said support member and depending therefrom, said fingers being spaced relative to each other in a direction away from said bale chamber and including a forward finger, drive means connected to said forward end of said support member for reciprocating the member toward and then away from said bale chamber in timed relation with said plunger and when reciprocating the support member toward said bale chamber moving said forward finger downwardly toward said platform, then for an extended distance substantially parallel to the platform, and then into said bale chamber through said side opening and top slot and upwardly relative to the platform and bale chamber whereby hay delivered to the bale chamber by said forward finger is directed toward the upper outer portion of the bale chamber and the forward finger is extracted up through said slot and out of the way of said plunger on the next working stroke of the plunger, and means supporting said rear end of said support member.

12. In a hay baler, a generally horizontally extending bale chamber formed with a feed opening in a vertical side wall thereof and a slot in the top wall thereof, said slot communicating with said opening, a plunger reciprocable in said chamber and past said opening and slot, a hay receiving platform extending laterally from said opening, a support member extending above said bale chamber and platform in the direction of extent of the platform, said support member having a forward end proximate to said bale chamber and a rear end remote therefrom, a plurality of feed fingers mounted on said support member and depending therefrom, said fingers being spaced relative to each other in a direction away from said bale chamber and including a forward finger, drive means connected to said forward end of said support member for reciprocating the member toward and then away from said bale chamber in timed relation with said plunger and when reciprocating the support member toward said bale chamber moving said forward finger downwardly toward said platform, then for an extended distance substantially parallel to the platform and into said bale chamber through said side opening and top slot, and then upwardly relative to the platform and bale chamber whereby hay delivered to the bale chamber by said forward finger is directed toward the upper outer portion of the bale chamber and the forward finger is extracted up through said slot and out of the way of said plunger on the next working stroke of the plunger, the distance of penetration of said finger into said bale chamber and past said vertical side wall being normally about one half the width of said bale chamber, and means supporting said rear end of said support member whereby when said forward end of the member moves said forward finger downwardly and then parallel to said platform said rear end of the member moves correspondingly, said rear end supporting means comprising a cam track fixedly mounted relative to said platform, a cam follower rollable over said cam track, and means connecting said cam follower to said rear end of said support member.

13. In a hay baler, a generally horizontally extending bale chamber having a feed opening in a vertical side wall thereof and a slot in a top wall thereof, said slot communicating with said opening, a plunger reciprocable in said chamber and past said opening and slot, a hay receiving platform extending laterally from said opening, a support member extending above said bale chamber and platform in the direction of extent of the platform, said support member having a forward end proximate to said bale chamber and a rear end remote therefrom, a plurality of feed fingers mounted on said support member and depending therefrom, said fingers being spaced relative to each other in a direction away from said bale chamber and including a forward finger and a rear finger, drive means connected to said forward end of said support member for reciprocating the member toward and then away from the bale chamber in timed relation with said plunger and when reciprocating said support member toward said bale chamber moving said forward finger downwardly toward said platform, then for an extended distance substantially parallel to the platform and into said bale chamber through said side opening and top slot, and then upwardly relative to the platform and bale chamber wherbey hay delivered to the bale chamber by the forward finger is directed toward the upper outer portion of the bale chamber and the forward finger is extracted up through said slot and out of the way of said plunger on the next working stroke of the plunger, means for connecting said rear finger to said support member whereby such finger extends in a given angular direction relative to the support member when moving toward said bale chamber and is pivotal from said angular direction when moving away from the bale chamber, and means supporting said rear end of said support member comprising a cam track fixedly mounted relative to said platform and extending downwardly toward said platform and bale chamber and then generally parallel to the platform, cam follower means rollable over said cam track, and means pivotally connecting said cam follower means to said rear end of said support member.

14. In a hay baler, a generally horizontally extending bale chamber having a pair of spaced, vertical side walls one of which has a feed opening, a plunger reciprocable in said chamber and past said opening, a hay receiving platform extending from said opening, and means operable in a vertical plane perpendicular to said bale chamber for feeding hay into the chamber and through said opening, said feeding means comprising a support member mounted above said platform, a feed finger connected to said support member and extending in a given angular direction therefrom throughout each feeding stroke of said feeding means, drive means for reciprocating said support member toward and away from said bale chamber in timed relation to the reciprocations of said plunger, said feed finger engaging hay on said platform when said support member is moving toward said bale chamber and feeding the hay through said opening in said one side wall and directing it against the other side wall of said pair of walls, said feed finger entering said bale case and having a maximum penetration past said one side wall approximately one half at least the space between said pair of walls, and yielding means connected between said drive means and said support member operative responsive to an accumulation of hay between said finger and said other side wall on a feeding stroke to permit said penetration of said finger to be arrested at any point between said maximum penetration and a point adjacent said opening in said one side wall and without changing the angular extension of the finger relative to said support member.

15. In a hay baler as recited in claim 14 wherein said support member is elongate, having an end proximate to said bale chamber and an end remote therefrom, said feed finger comprising a first feed finger and being connected to said support member adjacent said proximate end, and a second feed finger connected to said support member at a point spaced from said proximate end and said first finger and extending in a given angular direction therefrom throughout each feeding stroke of said feeding means, the space between said fingers being greater than one half the space between said bale chamber side walls.

16. In a hay baler, a generally horizontally extending bale chamber having a pair of spaced vertical side walls and a top wall, one of said side walls having a feed opening and said top wall having a slot communicating with said opening, a hay receiving platform extending from said opening, and means operable in a vertical plane perpendicular to said bale chamber for feeding hay into the chamber through said opening and for simultaneously automatically regulating quantitatively the feeding of such hay, said feeding means comprising a support member mounted above said platform, said support member having an end proximate to said bale chamber and an end remote therefrom, a first feed finger connected to said support member adjacent said proximate end, a second finger spaced from said first finger and connected to said support member between said remote end and the first finger, means for reciprocating said support member toward and away from said bale chamber in timed relation with the reciprocations of said plunger and when moving the support member toward the bale chamber moving said first finger into said chamber through said opening and extracting it up through said slot while maintaining said second finger in feeding relation to said opening until after said first finger has been extracted, the spacing of said fingers being such that said second finger outside of said bale chamber during each working stroke of said feed means, and yielding means connected between said reciprocating means and said support member effective first to permit said first finger to yield throughout its path of travel through said bale chamber responsive to an accumulation of hay between the first finger and the other vertical side wall and when said first finger is extracted up through said slot providing a yielding action responsive to accumulated hay between the second finger and said other side wall.

17. In a hay baler as recited in claim 16 wherein said second finger is connected to said support member for adjustment toward and away from said first finger.

References Cited in the file of this patent

UNITED STATES PATENTS

| | | |
|---|---|---|
| 521,817 | Rice | June 26, 1894 |
| 521,823 | Sargent | June 26, 1894 |
| 1,281,331 | Fletcher | Oct. 15, 1918 |
| 1,340,964 | Ligon | May 25, 1920 |
| 2,045,763 | Everett | June 30, 1936 |
| 2,279,837 | Newlin | Apr. 14, 1942 |
| 2,409,478 | Dickow | Oct. 15, 1946 |
| 2,572,180 | Morrison | Oct. 23, 1951 |
| 2,720,073 | Freeman et al. | Oct. 11, 1955 |
| 2,725,009 | Bornzin | Nov. 29, 1955 |
| 2,760,625 | Lohnert | Aug. 28, 1956 |
| 2,862,347 | Nelson | Dec. 2, 1958 |
| 2,885,953 | Miller | May 12, 1959 |

FOREIGN PATENTS

| | | |
|---|---|---|
| 16,505 | Denmark | Oct. 7, 1912 |
| 552,225 | Germany | June 13, 1932 |
| 613,390 | Great Britain | Nov. 25, 1948 |
| 741,233 | Great Britain | Nov. 30, 1955 |
| 1,051,222 | France | Sept. 9, 1953 |